(12) United States Patent
Osada

(10) Patent No.: US 11,245,801 B2
(45) Date of Patent: Feb. 8, 2022

(54) IMAGE FORMING APPARATUS AND IMAGE FORMING METHOD CAPABLE OF CHANGING GUIDANCE SCREEN FROM TERMINAL

(71) Applicant: KYOCERA Document Solutions Inc., Osaka (JP)

(72) Inventor: Yoshihiro Osada, Torrance, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/836,524

(22) Filed: Mar. 31, 2020

(65) Prior Publication Data

US 2021/0306483 A1    Sep. 30, 2021

(51) Int. Cl.
*H04N 1/00*    (2006.01)

(52) U.S. Cl.
CPC ................ *H04N 1/00408* (2013.01)

(58) Field of Classification Search
None
See application file for complete search history.

(56) References Cited

U.S. PATENT DOCUMENTS

| | | | | |
|---|---|---|---|---|
| 5,669,040 A * | 9/1997 | Hisatake | ................ | G03G 15/50 358/296 |
| 8,610,908 B2 * | 12/2013 | Dan | ................ | G06F 3/121 358/1.13 |
| 9,118,860 B2 * | 8/2015 | Miyahara | ................ | H04N 1/3871 |
| 9,292,771 B2 * | 3/2016 | Taguchi | ................ | G06K 15/1851 |
| 9,712,697 B1 * | 7/2017 | Gopalakrishnan | ................ | H04N 1/00774 |
| 9,924,051 B2 * | 3/2018 | Kubota | ................ | G06F 3/1285 |
| 10,599,376 B2 * | 3/2020 | Kubota | ................ | G06F 3/1274 |
| 2006/0221358 A1 * | 10/2006 | Takahashi | ................ | H04N 1/00472 358/1.1 |
| 2007/0070377 A1 * | 3/2007 | Hirabayashi | ................ | G06K 15/02 358/1.13 |
| 2007/0177203 A1 * | 8/2007 | Kamasuka | ................ | H04N 1/00278 358/1.15 |
| 2008/0134070 A1 * | 6/2008 | Kobayashi | ................ | G06F 3/0485 715/767 |
| 2008/0285892 A1 * | 11/2008 | Sposato | ................ | H04N 1/00132 382/311 |
| 2009/0172585 A1 * | 7/2009 | Sato | ................ | H04N 1/00474 715/773 |
| 2009/0251725 A1 * | 10/2009 | Kuwahara | ................ | G06F 3/1204 358/1.15 |

(Continued)

FOREIGN PATENT DOCUMENTS

JP    2007058407 A    3/2007

*Primary Examiner* — Anh-Vinh Thi Nguyen
(74) *Attorney, Agent, or Firm* — Hawaii Patent Services; Nathaniel K. Fedde; Kenton N. Fedde

(57) ABSTRACT

Provided is an image forming apparatus capable of changing a guidance screen from a terminal. An instruction acquiring unit acquires an instruction to change a guidance screen stored in a storage unit. A change acquiring unit acquires change data corresponding to the instruction acquired by the instruction acquiring unit from an external terminal 2. A change application unit applies the change data acquired by the change acquiring unit to screen data of the guidance screen. A display unit displays the screen data of the guidance screen to which the change data is applied by the change application unit.

20 Claims, 6 Drawing Sheets

(56) References Cited

U.S. PATENT DOCUMENTS

| | | | |
|---|---|---|---|
| 2009/0284769 A1* | 11/2009 | Akashi | H04N 1/32112 358/1.9 |
| 2009/0284787 A1* | 11/2009 | Imai | H04N 1/00408 358/1.15 |
| 2010/0238469 A1* | 9/2010 | Nakagama | G03G 15/5087 358/1.9 |
| 2010/0245925 A1* | 9/2010 | Hori | H04N 1/405 358/3.06 |
| 2011/0252347 A1* | 10/2011 | Osawa | H04N 1/0097 715/765 |
| 2011/0279842 A1* | 11/2011 | Abe | G06F 3/1271 358/1.13 |
| 2011/0292438 A1* | 12/2011 | Inami | H04N 1/00411 358/1.15 |
| 2012/0041570 A1* | 2/2012 | Jones | G05B 19/0426 700/17 |
| 2012/0081731 A1* | 4/2012 | Suzuki | G06F 3/1247 358/1.13 |
| 2012/0224197 A1* | 9/2012 | Suzuki | G06F 3/1287 358/1.9 |
| 2012/0229832 A1* | 9/2012 | Tsujimoto | G06F 3/1204 358/1.13 |
| 2012/0229833 A1* | 9/2012 | Nakagawa | G06F 3/1288 358/1.13 |
| 2014/0059612 A1* | 2/2014 | Selim | H04N 5/45 725/41 |
| 2014/0185070 A1* | 7/2014 | Muramoto | H04N 1/50 358/1.9 |
| 2014/0293344 A1* | 10/2014 | Umezawa | G03G 15/5016 358/1.15 |
| 2014/0320880 A1* | 10/2014 | Kotsuji | G06F 3/1267 358/1.13 |
| 2014/0359307 A1* | 12/2014 | Toyoda | G06F 21/606 713/189 |
| 2015/0181060 A1* | 6/2015 | Miyazawa | H04N 1/00233 358/1.15 |
| 2016/0342369 A1* | 11/2016 | Sonogi | G06F 3/1248 |
| 2017/0017444 A1* | 1/2017 | Hirano | G06F 3/1286 |
| 2017/0078503 A1* | 3/2017 | Kitayama | G06F 3/1258 |
| 2017/0315759 A1* | 11/2017 | Lin | G06F 3/1238 |
| 2018/0035006 A1* | 2/2018 | Bermundo | G06F 3/1285 |
| 2018/0088883 A1* | 3/2018 | Hashimoto | G06F 3/1278 |
| 2018/0211143 A1* | 7/2018 | Haruta | H04N 1/4092 |
| 2018/0213112 A1* | 7/2018 | Chapman | H04N 1/32251 |
| 2018/0260174 A1* | 9/2018 | Matsui | G06K 15/1856 |
| 2019/0191045 A1* | 6/2019 | Ikeda | H04N 1/00498 |
| 2019/0273839 A1* | 9/2019 | Shiotani | H04N 1/00251 |
| 2019/0303181 A1* | 10/2019 | Mori | G06F 9/453 |
| 2019/0306349 A1* | 10/2019 | Shino | H04N 1/00517 |
| 2019/0356807 A1* | 11/2019 | Takahashi | H04N 1/00344 |
| 2020/0280654 A1* | 9/2020 | Achiwa | G06N 3/08 |
| 2020/0372606 A1* | 11/2020 | Ikeda | G06F 3/04845 |
| 2020/0402036 A1* | 12/2020 | Doka | G06Q 20/209 |
| 2021/0026998 A1* | 1/2021 | Hoppe | G06F 30/12 |

\* cited by examiner

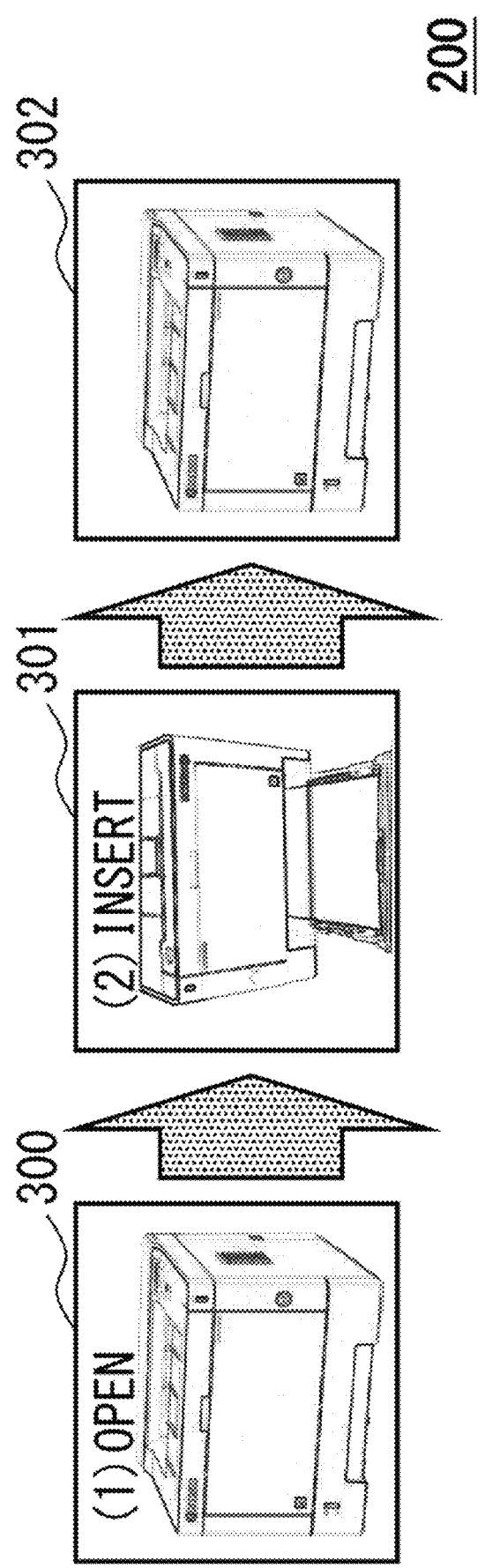

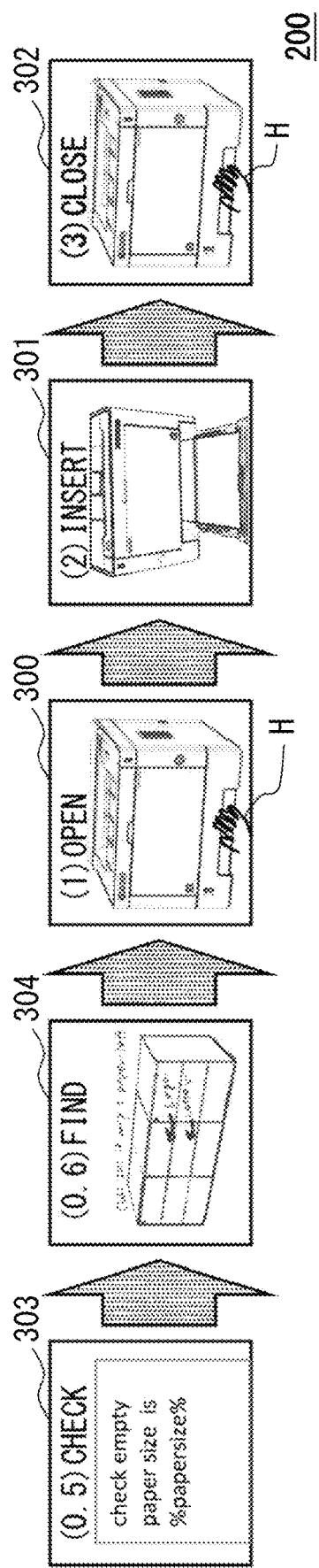

IMAGE FORMING APPARATUS AND IMAGE FORMING METHOD CAPABLE OF CHANGING GUIDANCE SCREEN FROM TERMINAL

BACKGROUND

The present disclosure relates to an image forming apparatus and an image forming method, and more particularly to an image forming apparatus and an image forming method capable of displaying a guidance screen.

There are image forming apparatuses such as multifunctional peripherals (MFP) and the like capable of printing a document or an image.

Some of these image forming apparatuses are capable of displaying an operation guidance screen on an operation panel unit.

As a typical technology, an image forming apparatus is disclosed in which operation guidance information for displaying a guidance screen is stored in a storage unit. In this image forming apparatus, when text information is inputted on an operation panel unit, the inputted text information is correlated with the operation guidance information and stored.

SUMMARY

An image forming apparatus according to the present disclosure includes: a storage unit configured to store screen data of a guidance screen; an instruction acquiring unit configured to acquire an instruction to change the guidance screen stored in the storage unit; a change acquiring unit configured to acquire change data corresponding to the instruction acquired by the instruction acquiring unit from an external terminal; a change application unit configured to apply the change data acquired by the change acquiring unit to the screen data of the guidance screen; and a display unit configured to display the screen data of the guidance screen to which the change data is applied by the change application unit.

An image forming method according to the present disclosure is an image forming method that is executed by an image forming apparatus comprising the steps of: in the image forming apparatus, storing screen data of a guidance screen; acquiring an instruction to change the stored guidance screen; acquiring change data corresponding to the acquired instruction from an external terminal; applying the acquired change data to the screen data of the guidance screen; and displaying the screen data of the guidance screen to which the change data is applied.

A non-transitory computer-readable recording medium according to the present disclosure includes instructions that is executed by an image forming apparatus, and the instructions including the steps of: in the image forming apparatus, storing screen data of a guidance screen; acquiring an instruction to change the stored guidance screen; acquiring change data corresponding to the acquired instruction from an external terminal; applying the acquired change data to the screen data of the guidance screen; and displaying the screen data of the guidance screen to which the change data is applied.

BRIEF DESCRIPTION OF THE DRAWINGS

FIG. 5 is an example of screen data before change in the guidance screen change process illustrated in FIG. 3.

FIG. 6 is an example of screen data after change in the guidance screen change process illustrated in FIG. 3.

DETAILED DESCRIPTION

<Embodiment>
[System Configuration of an Image Forming Apparatus 1]

Figure 1:
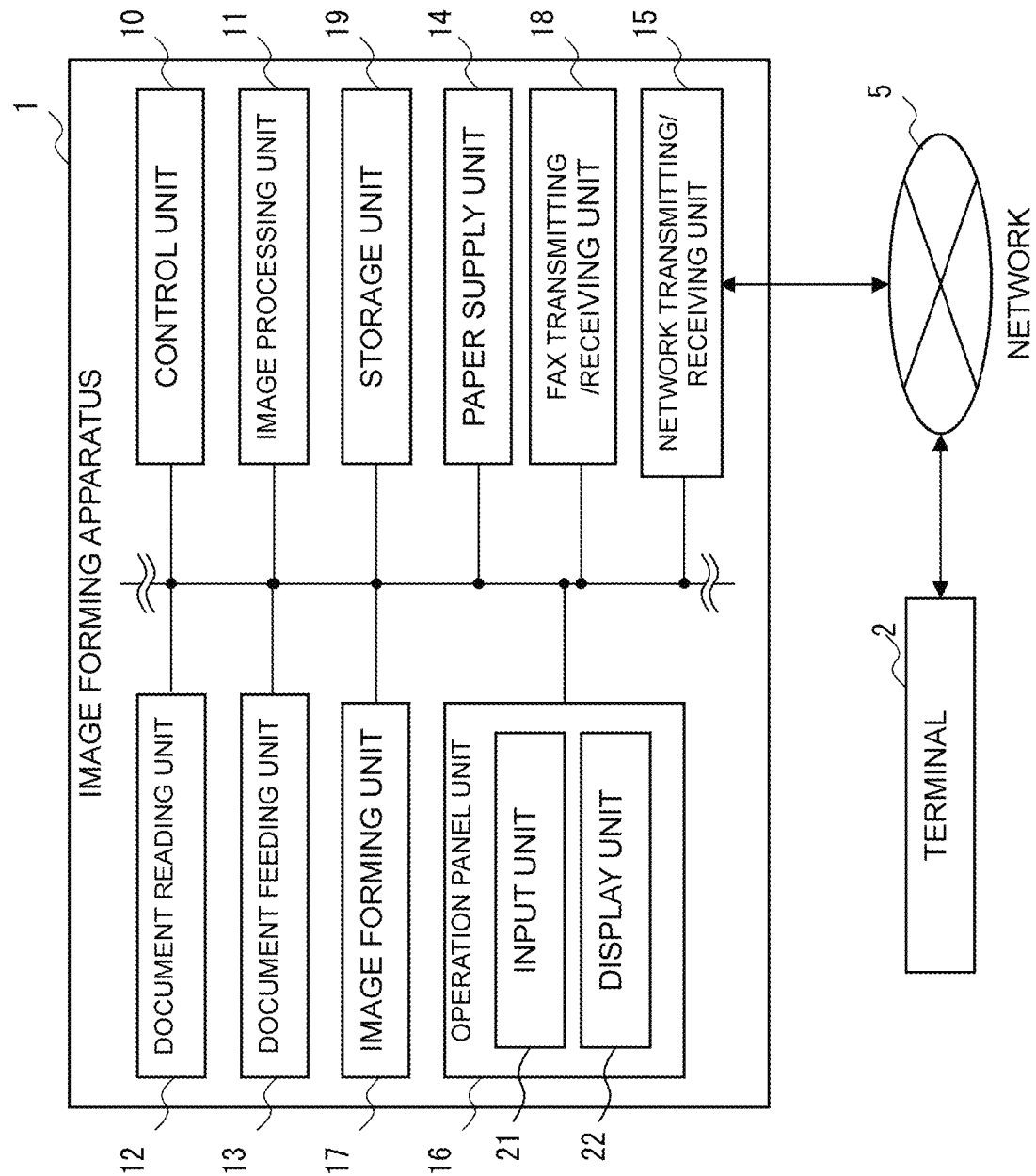
FIG. 1 is a system configuration diagram of an image forming apparatus of an embodiment according to the present disclosure.

First, a system configuration of an image forming apparatus 1 will be described with reference to FIG. 1.

The image forming apparatus 1 includes: an image processing unit 11, a document reading unit 12, a document feeding unit 13, a paper supply unit 14, a network transmitting/receiving unit 15, an operation panel unit 16, an image forming unit 17 (image forming means), a FAX transmitting/receiving unit 18, a storage unit 19, and the like. Each unit is connected to the control unit 10 and the operation is controlled by the control unit 10.

The control unit 10 is an information processing unit such as a general purpose processor (GPP), a central processing unit (CPU), a micro processing unit (MPU), a digital signal processor (DSP), a graphics processing unit (GPU), an application specific integrated circuit (ASIC, application specific processor) or the like.

The control unit 10 reads a control program stored in an ROM or an HDD of the storage unit 19 and expands the control program in the RAM, and then by executing the control program, operates as each unit of a function block described later. In addition, the control unit 10 performs overall control of the apparatus according to specified instruction information that is inputted from an external terminal or the operation panel unit 16.

The image processing unit 11 is a control operation means such as a digital signal processor (DSP), a graphics processing unit (GPU) or the like. The image processing unit 11 performs a specified image process on image data. This specified image process may be, for example, a process such as enlargement/reduction, density adjustment, gradation adjustment, image improvement and the like.

In addition, the image processing unit 11 stores the image read by the document reading unit 12 in the storage unit 19 as print data. At this time, the image processing unit 11 may also convert the print data into an electronic document such as PDF or the like, or a file of image data such as TIFF or the like. Moreover, the image processing unit 11 may be capable of executing at least a part of an optical character recognition (OCR) process.

The document reading unit 12 reads a set document. In addition, the document reading unit 12 is provided above the main body of the image forming apparatus 1.

The document reading unit 12 includes a scanner, a platen glass, and a document reading slit. In a case of reading a document placed on the platen glass, the document reading unit 12 moves the scanner to a position facing the platen glass and reads the document placed on the platen glass while scanning the document to acquires image data, and then outputs the acquired image data to the control unit 10.

Moreover, in a case of reading a document that is fed from the document feeding unit 13, the document reading unit 12 moves the scanner to a position facing the document reading slit. Then, the document reading unit 12 reads the document via the document reading slit in synchronization with the document conveying operation of the document feeding unit 13 and acquires image data. The document reading unit 12 outputs the acquired image data to the control unit 10.

The document feeding unit 13 conveys a document to be read by the document reading unit 12. The document feeding unit 13 is provided above the document reading unit 12.

The document feeding unit 13 includes a document placement unit and a document conveying mechanism. The document feeding unit 13 sequentially feeds out the documents placed on the document placement unit one by one by the document conveying mechanism and feeds the documents to the document reading unit 12.

The paper supply unit 14 feeds out sheets of recording paper one by one toward the image forming unit 17. The paper supply unit 14 is provided in the main body.

The network transmitting/receiving unit 15 is a network connection unit that includes a LAN board, a wireless transceiver, and the like for connecting to the network 5, which is an external network. The network 5 of the present embodiment is, for example, a local area network (LAN), a wireless LAN such as WiFi or the like, a short-range wireless such as Bluetooth (registered trademark), near field network (NFC), a wide area network (WAN), a mobile phone network, a voice telephone network, or the like.

The network transmitting/receiving unit 15 transmits or receives data via a data communication line, and transmits or receives a voice signal via a voice telephone line.

In the present embodiment, the network transmitting/receiving unit 15 is able to connect to a user terminal 2 via the network 5. The terminal 2, for example, is a computer such as a personal computer (PC), a smartphone, a mobile phone, a personal data assistant (PDA) and the like that can be used by a user.

The terminal 2 is capable of installing and executing various application software (hereinafter, simply referred to as an "app"). In the present embodiment, for example, the terminal 2 is installed with a photo retouching app, a camera app, an office app, and the like. The photo retouching app is an app that is capable of processing image data. The camera app is an app for capturing an image with a camera built in the terminal 2. The office app is an app such as a word processor app, a spreadsheet app, a presentation app or the like that is capable of editing or creating document data including documents, tables, slides, and the like.

These apps may be installed on the terminal 2 as standard (default), or may be installed by the user by downloading or the like.

In other words, with the terminal 2 it is possible to perform various work including the execution of various apps that the user is familiar with, processing of data, and the like.

The operation panel unit 16 includes an input unit 21 such as buttons, a touch panel, and the like, and a display unit 22 such as a liquid-crystal display (LCD), an organic EL display or the like. In addition, the operation panel unit 16 is provided on the front side of the image forming apparatus 1.

The buttons of the input unit 21 of the operation panel unit 16 are a numeric keypad, start button, a cancel button, a button for switching an operating mode, an instruction button for executing a job, and the like. The operation mode may include a type of mode such as copying, FAX transmission, scanner, network scanner and the like. Moreover, the job includes printing, transmission, storage, recording, and the like of a selected document. The input unit 21 of the operation panel unit 16 acquires instructions of various jobs of the image forming apparatus 1 by a user. In addition, it is also possible to input and change information of each user according to a user instruction acquired from the operation panel unit 16.

The image forming unit 17, according to an output instruction from a user, forms an image on recording paper from data stored in the storage unit 19, read by the document reading unit 12 or obtained from an external terminal.

The image forming unit 17 includes a photosensitive drum, an exposing unit, a developing unit, a transfer unit, a fixing unit, and the like. The image forming unit 17 records a toner image on recording paper by executing an image forming process that includes charging, exposure, development, transfer, and fixing.

The FAX transmitting/receiving unit 18 performs facsimile transmission or reception. The FAX transmitting/receiving unit 18 is capable of receiving facsimile data from another FAX apparatus via a voice line, store the facsimile data in the storage unit 19, and cause the image forming unit 17 to form an image. In addition, the FAX transmitting/receiving unit 18 is able to convert a document read by the document reading unit 12 or the network FAX data transmitted from an external terminal into image data and transmit the image data to another FAX apparatus via a voice line.

The storage unit 19 is a non-transitory recording medium such as a semiconductor memory such as a read only memory (ROM) and a random access memory (RAM), a hard disk drive (HDD), or the like.

A control program for performing control of the operation of the image forming apparatus 1 is stored in the ROM or the HDD of the storage unit 19. In addition to this, the storage unit 19 stores status data of each unit of the image forming apparatus 1, print data described in page description language (PDL) outputted from the terminal 2, and the like. This status data also includes data related to an error notification.

Furthermore, the storage unit 19 also stores user account settings. In addition, the storage unit 19 may include a storage folder area for each user.

Note that in the image forming apparatus 1, the control unit 10 and the image processing unit 11 may be integrally formed, such as a CPU with a built-in GPU, a chip-on-module package, a system on a chip (SOC), and the like.

Moreover, the control unit 10 and the image processing unit 11 may include a RAM, a ROM, a flash memory, or the like.

[Functional Configuration of the Image Forming Apparatus 1]

Figure 2:
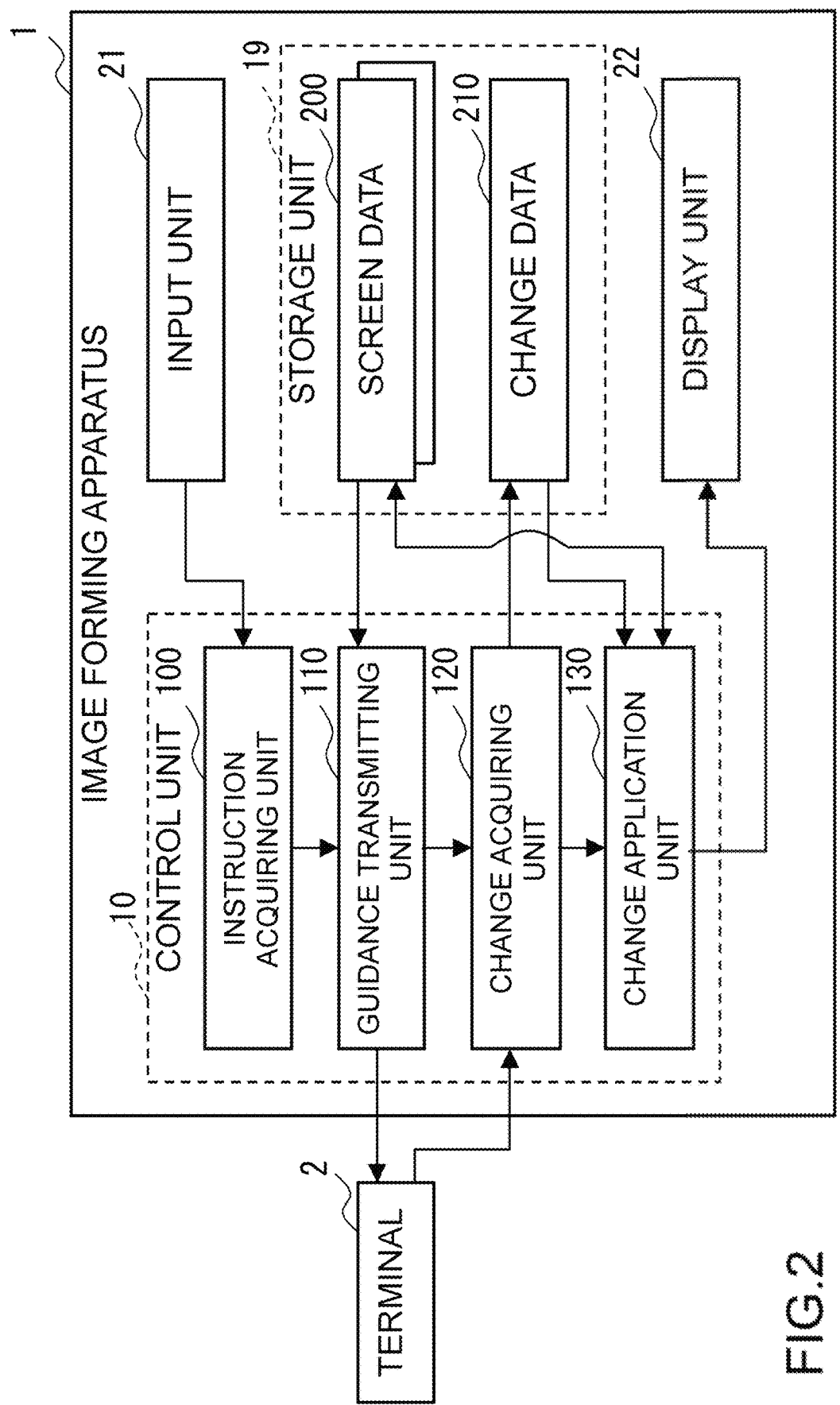
FIG. 2 is a block diagram illustrating a functional configuration of the image forming apparatus of an embodiment according to the present disclosure.

Here, a functional configuration of the image forming apparatus 1 will be described with reference to FIG. 2.

The control unit 10 of the image forming apparatus 1 includes an instruction acquiring unit 100, a guidance transmitting unit 110, a change acquiring unit 120, and a change application unit 130.

The storage unit 19 stores screen data 200 and change data 210.

The instruction acquiring unit 100 acquires a change instruction for changing the guidance screen stored in the storage unit 19. The change instruction may be acquired from the input unit 21 of the operation panel unit 16 using a graphical user interface (GUI).

The guidance transmitting unit 110 transmits screen data 200 of the guidance screen.

For example, the guidance transmitting unit 110 may transmit the screen data 200 of the guidance screen to the terminal 2 according to a scan instruction from the terminal 2. At this time, the guidance transmitting unit 110 transmits the screen data 200 in response to the change instruction from the instruction acquiring unit 100.

The change acquiring unit 120, from the external terminal 2, acquires change data 210 corresponding to an instruction acquired by the instruction acquiring unit 100.

For example, the change acquiring unit 120 may acquire print data outputted by the terminal 2 as the change data 210. In addition, the change acquiring unit 120 may also acquire print data outputted by an apparatus other than the terminal 2 as the change data 210.

The change application unit 130 applies the change data 210 acquired by the change acquiring unit 120 to the screen data 200 of the guidance screen.

For example, the change application unit 130 performs a change by replacing or inserting the change data 210 into the screen data 200 of each guidance screen.

In the present embodiment, the display unit 22 displays the screen data 200 of the guidance screen to which the change data 210 has been applied by the change application unit 130.

The screen data 200 is data of a guidance screen. In the present embodiment, the storage unit 19 stores a plurality of screen data 200 for each guidance screen. The screen data 200 may, for example, be image data of various still images, video data, document data, and the like. Of these, image data of a still image may include bitmap data such as jpeg, PNG, gif and the like, and draw data such as SVG and PS (PostScript) (registered trademark) and the like. The video data may be video data in a format such as 3GPP, mpeg and the like that can be generally captured by the terminal 2. The document data may include text data, data in a markup language such as HTML or XML, print data described in PS, PDF, PDL, or the like, files of a word processor app, a spreadsheet app, a presentation app, and the like.

The change data 210 is data of a guidance screen processed by the external terminal 2.

More specifically, the change data 210 may be, for example, print data printed by the terminal 2. Alternatively, the change data 210 may include arbitrary still image data, video data, document data, and the like. Furthermore, the change data 210 may include data obtained by processing the screen data 200.

Here, the control unit 10 of the image forming apparatus 1, by executing the control program stored in the storage unit 19, may function as the instruction acquiring unit 100, the guidance transmitting unit 110, the change acquiring unit 120, and the change application unit 130.

In addition, each unit of the image forming apparatus 1 described above becomes a hardware resource for executing the image forming method according to the present disclosure.

Note that a part or any arbitrary combination of the above-described functional configurations may be hardware-configured or circuitry-configured using an IC, programmable logic, an field-programmable gate array (FPGA), or the like.

[Guidance Screen Change Process by the Image Forming Apparatus 1]

Next, a guidance screen change process performed by the image forming apparatus 1 of an embodiment according to the present disclosure will be described with reference to FIG. 3 to FIG. 6.

In the guidance screen change process of the present embodiment, an instruction to change the guidance screen is acquired. Then, the change data 210 corresponding to the instruction is acquired from the terminal 2. The acquired change data 210 is applied to the screen data 200. Then, the screen data 200 to which the change data 210 is applied is displayed.

In the guidance screen change process according to the present embodiment, mainly, the control unit 10 executes a program stored in the storage unit 19 in cooperation with each unit using hardware resources.

Figure 3:
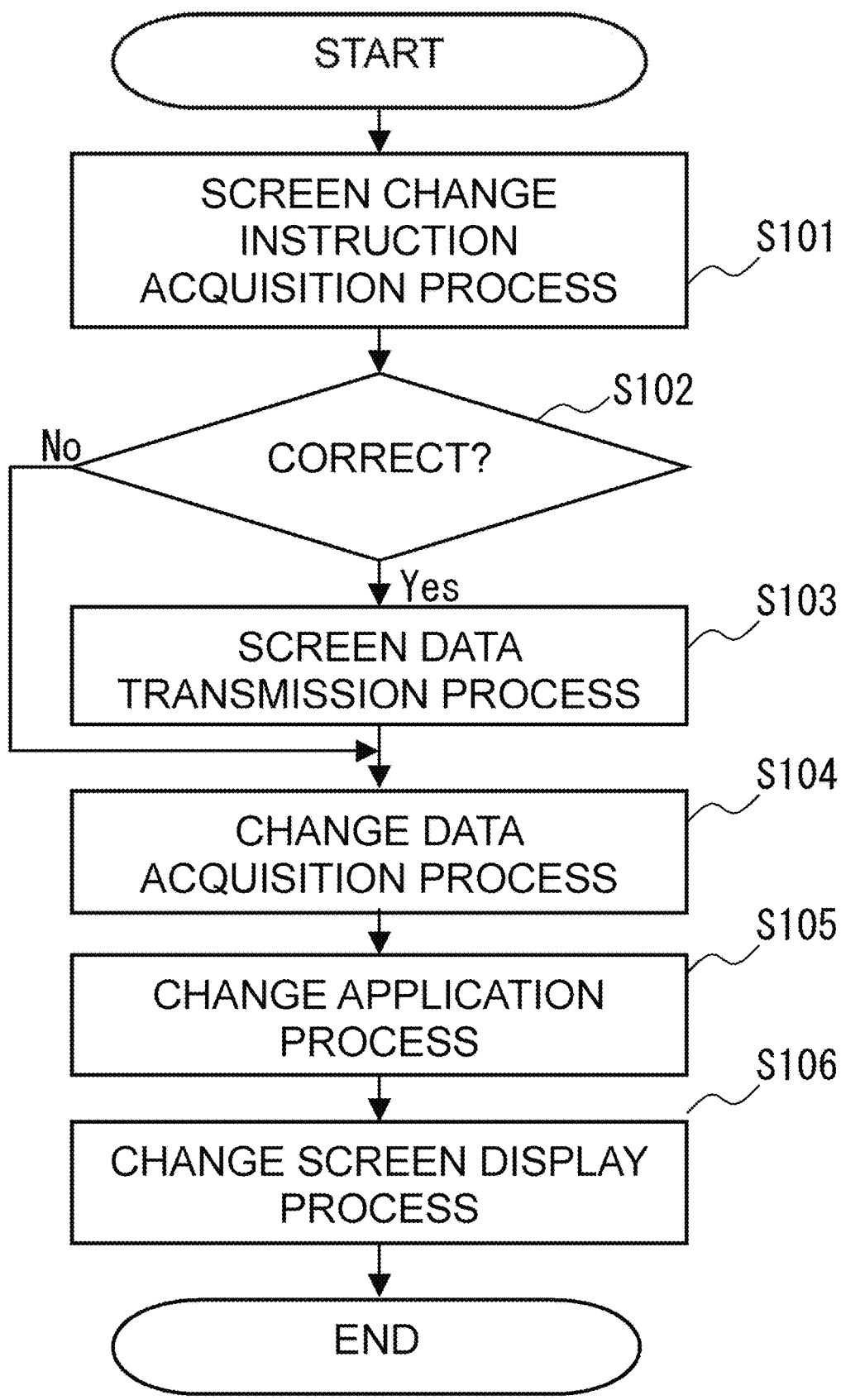
FIG. 3 is a flowchart of a guidance screen change process of an embodiment according to the present disclosure.

Hereinafter, details of the guidance screen change process will be described for each step with reference to the flowchart in FIG. 3.

(Step S101)

First, the instruction acquiring unit 100 performs a screen change instruction acquisition process.

The instruction acquiring unit 100 acquires a change instruction that is inputted from the input unit 21 by the user on each guidance screen displayed on the display unit 22 of the operation panel unit 16.

In the present embodiment, the instruction acquiring unit 100 displays a guidance screen in response to an error notification such as out of recording paper, out of toner, paper jam, or the like. In addition, the instruction acquiring unit 100 displays the guidance screen even when responding to a user instruction for displaying "guidance" or "help" during various operations using a menu or the like.

More specifically, the instruction acquiring unit 100 specifies a guidance screen corresponding to various situations such as the above-described error notification, instruction or the like. Then, the instruction acquiring unit 100 reads the data of the specified guidance screen from the screen data 200 stored in the storage unit 19, and causes the display unit 22 to display the data using the GUI.

At this time, the instruction acquiring unit 100 also draws buttons for editing and adding a guidance screen on the display unit 22. Then, for example, in a case where these buttons are pressed on a touch panel or the like, the instruction acquiring unit 100 acquires the instruction as a change instruction.

Figure 4:
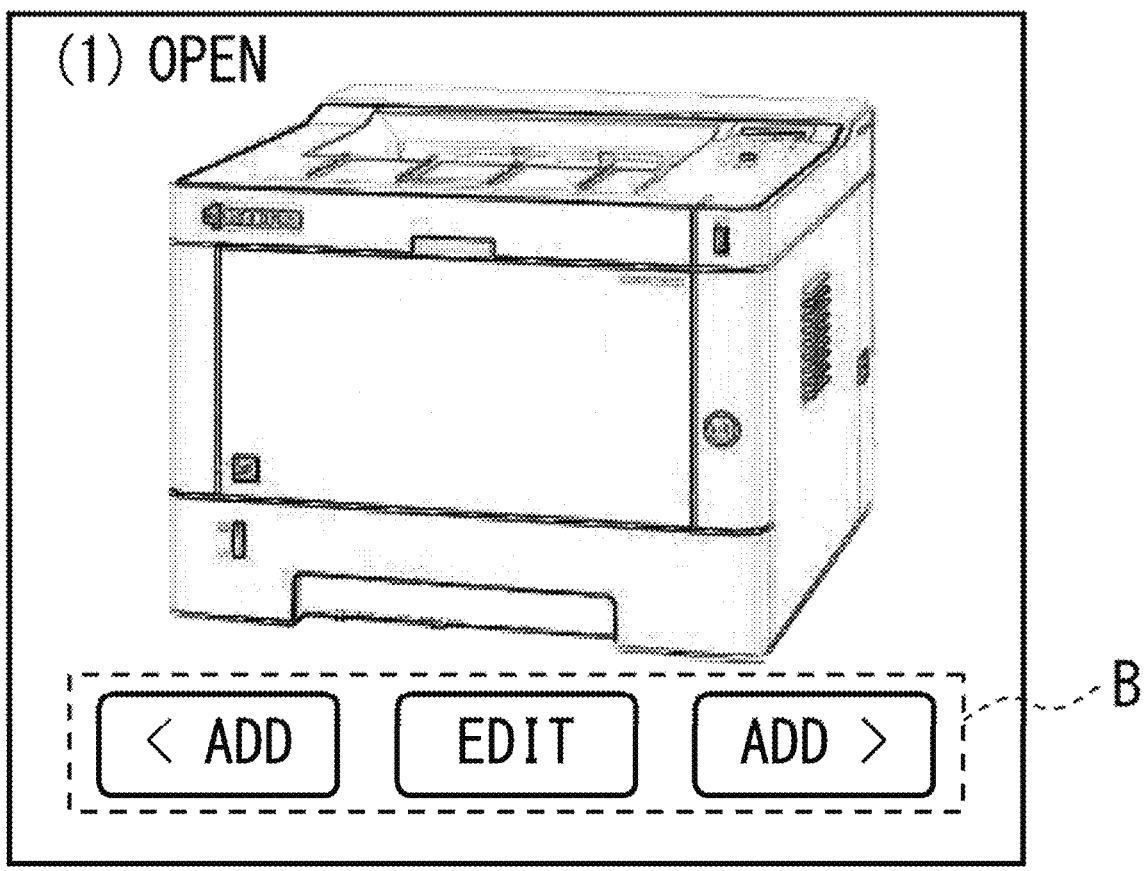
FIG. 4 is an example of a screen of the guidance screen change process illustrated in FIG. 3.

A screen example 500 in FIG. 4 illustrates an example of a guidance screen that is displayed on the display unit 22 when the recording paper runs out. In this example, as a button group B, an "<ADD" button for adding before the guidance screen, an "ADD>" button for adding after the guidance screen, and an "EDIT" button for correcting (editing) the screen itself are displayed.

For example, when these buttons are pressed on the touch panel, the instruction acquiring unit 100 acquires the instruction as a change instruction.

(Step S102)

Next, the instruction acquiring unit 100 determines whether or not a correction is to be made. In a case where an instruction to correct the guidance screen that is displayed on the display unit 22 is acquired, the instruction acquiring unit 100 determines YES. In the example of FIG. 4, in a case where the "EDIT" button is pressed, the instruction acquiring unit 100 determines YES. In other cases, the instruction acquiring unit 100 determines NO.

In the case of YES, the instruction acquiring unit 100 advances the process to step S103.

In the case of NO, the instruction acquiring unit 100 advances the process to step S104.

(Step S103)

In the case of a correction instruction, the guidance transmitting unit 110 performs a screen data transmission process.

Here, the guidance transmitting unit 110 transmits the screen data 200 of the guidance screen to the terminal 2 according to a scan instruction from the terminal 2.

More specifically, in the present embodiment, the user starts an app that the user is familiar with on the terminal 2 in a state in which the page desired to correct is displayed on the display unit 22. Here, scanning from the image forming apparatus 1 is selected using terminal 2.

As a result, instead of reading the document from document reading unit 12, the guidance transmitting unit 110 transmits the guidance screen displayed on display unit 22 to terminal 2 as image data. In other words, in the terminal 2, by performing the "scan" operation on the image forming apparatus 1, the screen data 200 of the guidance screen is acquired instead of the scanned image and can be processed.

Here, in the terminal 2, it is possible to process the transmitted screen data 200 using an app that the user is familiar with. For example, the user may delete a part of the image of the acquired screen data 200, draw or insert an additional picture or character, or add another image or the like using a photo retouching app.

Moreover, in the terminal 2, for changing the guidance screen, image data that is different from the screen data 200 transmitted from the image forming apparatus 1 may be acquired, or may be created, edited or processed by a photo retouching app or the like. In addition, in the terminal 2, it is also possible to capture image data of a still image or a video using a camera app and process the image data.

Furthermore, in the terminal 2, various kinds of files may also be created, edited, processed or the like by an office app.
(Step S104)

Here, the change acquiring unit 120 performs a change data acquisition process.

More specifically, the change acquiring unit 120 acquires the change data 210 transmitted from the terminal 2 in response to the above-described change instruction.

In the present embodiment, in a state where a change instruction is acquired on a guidance screen that is displayed on the display unit 22 of the image forming apparatus 1, the change acquiring unit 120 acquires the print data outputted from the terminal 2 as the change data 210.

Here, in the terminal 2, image data obtained by processing the screen data 200 transmitted as described above is outputted to the image forming apparatus 1 by printing and the like. Similarly, the processed data that is created, edited, obtained, or captured by the terminal 2 is also outputted to the image forming apparatus 1 by printing or the like. This outputted data is, for example, PDL print data.

The change acquiring unit 120 is able to acquire this print data as the change data 210.
(Step S105)

Next, the change application unit 130 performs a change application process.

The change application unit 130 applies the change data 210 stored in the storage unit 19 to the screen data 200 of the guidance screen.

The change data 210 is inserted as a new guidance screen before the displayed guidance screen in the case of the above-mentioned "add before" instruction, and after displayed guidance screen in the case of the above-mentioned "add after" instruction. On the other hand, in the case of the instruction of "correct (edit) the screen itself", the part transmitted as the guidance screen in the screen data 200 is replaced with the change data 210.

At this time, the change application unit 130 is able to interpret the PDL of the print data in the change data 210, convert the PDL into data for drawing the actual guidance screen, and apply the data to the screen data 200. This conversion may be, for example, conversion to a bitmap file, an HTML file, or the like according to the resolution and color of the display unit of the operation panel unit 16.

More specifically, an example of the change application process will be described with reference to FIG. 5 and FIG. 6.

FIG. 5 illustrates an example of the screen data 200 displayed when the recording paper runs out before the change data 210 is applied. In this example, the screen data 200 is configured to include three guidance screens 300, 301, and 302.

FIG. 6 illustrates an example of the screen data 200 after the change data 210 is applied to the screen data 200 in FIG. 5. In this example, guidance screens 303 and 304 are added before the guidance screen 300. Of these guidance screens, the guidance screen 303 is document data. In this document data, reserved words, macro languages and the like may also be used. In the example in FIG. 6, when the guidance screen is actually displayed, the size of the recording paper that has run out is inserted and displayed at the position of "% paper size %". The guidance screen 304 is an example in which change data 210 in which handwritten characters are drawn and processed is applied to a captured photo. In this way, it is possible to indicate the location where recording paper is required for the image forming apparatus 1.

In addition, the guidance screens 300 and 302 are partially processed by the terminal 2. For example, on the guidance screens 300 and 302, a picture of the hand H is added. As a result, it is possible to present an easy-to-understand way how to open the tray. Then, on the guidance screen 302, a caption of "(3) CLOSE" is added for easy understanding.
(Step S106)

Next, the change application unit 130 and the display unit 22 perform a change screen display process.

The change application unit 130 causes the display unit 22 to display the screen data 200 of the guidance screen. In other words, the display unit 22 is able to display the screen data 200 of the guidance screen to which the change data 210 has been applied.

This ends the guidance screen change process of an embodiment according to the present disclosure.

With the configuration described above, the following effects may be obtained.

In a typical technique, editing the guidance screen by inputting text information on the operation panel unit takes time.

However, a feature of the image forming apparatus 1 of an embodiment according to the present disclosure is that the image forming apparatus 1 includes: a storage unit 19 for storing screen data 200 of a guidance screen; an instruction acquiring unit 100 that acquires an instruction to change the guidance screen stored in storage unit 19; a change acquiring unit 120 that acquires change data 210 corresponding to an instruction acquired by the instruction acquiring unit 100 from an external terminal 2; a change application unit 130 that applies the change data 210 acquired by the change acquiring unit 120 to the screen data 200 of the guidance screen; and a display unit 22 that displays the screen data 200 of the guidance screen to which the change data 210 has been applied by the change application unit 130.

With this configuration, the guidance screen may be easily changed by the terminal 2 that the user is familiar with.

More specifically, in a typical technique, an operation panel unit is used when inputting text on a guidance screen, so unless the user is familiar with the GUI of the operation panel unit, the operation is troublesome. Furthermore, the operation panel unit is not designed to be used for a long period of time while standing. Therefore, such usage is a physical burden. Furthermore, such usage inconveniences other users wanting to use the image forming apparatus for making copies or the like, so a user is not able to perform work in a relaxed manner. For this reason, motivation for the user to change the guidance screen is reduced in the first place.

On the other hand, in the image forming apparatus 1 of the present embodiment, it is possible to apply the change data 210 created, edited, and processed on the terminal 2 that the user is familiar with to the screen data 200. In other words, for example, in a case where the user is proficient in imaging and image processing in a SNS or the like, an operation such as "processing a few points of attention on the error notification screen" may be easily realized. That is, the guidance screen may be easily changed by using only an app that has already been downloaded and installed on the terminal 2 without laboring to find and install a special app or the like.

As a result, the labor of the user may be reduced, and the operating cost of the image forming apparatus 1 in an office or the like may be reduced.

In addition, in a typical image forming apparatus, when the recording paper runs out, information set in the image forming apparatus, such as "Out of Paper. Second Tray, Size A4", may be displayed.

However, in a typical image forming apparatus, it may be difficult to display business rules specific to an office or the like where the image forming apparatus is installed.

Here, in an office or the like, it may be necessary to perform troublesome work. For example, a newcomer who is not familiar with the business rules may not know the business rule of "must order when the recording paper runs out" even when knowing the cabinet where the recording paper is located. In this case, the newcomer does not place an order when the recording paper runs out, and a delay in ordering may hinder business. Alternatively, in a case where an out-of-toner warning occurs, as a business rule, when the user does not know where the replacement toner is located, a user who feels replacing the toner would be troublesome may stop printing. Alternatively, even in a case where the toner is not replaced, the warning display may not be displayed when the system is restarted, and when such a solution is taken, the work may be postponed or potential business trouble may occur.

In preparation for such a case, offices and the like sometimes prepare materials for business rules. For example, as such a material, a handmade booklet may be hung on the image forming apparatus, or a document that may be referred to in a shared server may be prepared. However, in some cases these materials may not be utilized because they cannot be found by users or are troublesome to refer to. Furthermore, for tasks that are rarely encountered in the first place, creating materials takes time, so in some cases the materials are not prepared.

On the other hand, the image forming apparatus 1 of the present embodiment may present a guidance screen to which a business rule, which is a "local rule", is added in an easy-to-understand manner for the user, so there is no need to prepare separately materials or the like.

In a typical technique, the user is not able change the image of the guidance screen itself.

On the other hand, a feature of the image forming apparatus 1 of an embodiment according to the present disclosure is that the change acquiring unit 120 acquires print data outputted from the terminal 2 as change data 210.

With this configuration, by simply printing the portion of the guidance screen desired to change on the terminal 2 by the user, that portion may be applied to the screen data 200 as change data 210. As a result, even without using a special app or the like, taking a photo with a general-purpose camera app, creating a photo using a general-purpose photo retouching app, or editing with an office app, change data 210 may be easily created in a user-friendly environment. As described above, by being able to use the processed photo or picture created, edited, and the like by a user as a guidance screen, the guidance screen may be made even easier for a user to understand. In other words, data can be transmitted and received as the target for the "guidance screen" instead of "paper" as the target for the image forming apparatus 1, and correction may be easily performed by directly using a scan operation and a print operation as is.

In addition, a feature of the image forming apparatus 1 of an embodiment according to the present disclosure is that a guidance transmitting unit 110 that transmits screen data 200 of a guidance screen is provided, and the change data 210 may be obtained by processing the screen data 200.

With this configuration, the terminal 2 is able to easily process the screen data 200 of the portion desired to correct.

Moreover, a feature of the image forming apparatus 1 of an embodiment according to the present disclosure is that guidance transmitting unit 110 transmits screen data 200 of a guidance screen to terminal 2 according to a scan instruction from terminal 2.

With such a configuration, it is possible to acquire the screen data 200 of the desired portion on the guidance screen that is to be changed, simply by scanning the terminal 2. In other words, the change data 210 may be prepared by simply acquiring an image using the normal scanning function in the terminal 2 and performing editing or the like of the image. Therefore, processing of the guidance screen can be realized by using only the general-purpose functions of the terminal 2.

(Other Embodiments)

Note that in the above-described embodiment, an example is described in which, when an instruction to change the guidance screen is acquired and the guidance screen is transmitted to the terminal 2, or when change data 210 is acquired, switching of the scan source and print destination of the image forming apparatus 1 is performed.

However, when the screen data 200 is transmitted or the change data 210 is acquired, configuration may be such that switching is possible by the scan source or the print destination terminal 2. In this case, for example, a setting of "read guidance image" may prepared on the "scan setting" screen or the like of the device driver of the terminal 2, or a dedicated printer for "output guidance image" may be selected as a print destination. Alternatively, a special port or the like may be prepared by a device driver so that the screen data 200 and the change data 210 may be transmitted to and received from the terminal 2.

With this kind of configuration, it is not necessary to switch the scan and print settings of the image forming apparatus 1 before and after the guidance screen is changed. In addition, another job or the like can be executed without interruption or the like.

Moreover, in the embodiment described above, an example in which changing of the guidance screen is performed one time has been described.

However, even in a case where the changing of the guidance screen is interrupted once, configuration is possible in which the change may be easily continued later.

In this case, it is possible to execute a process that makes it easy to grasp that the guidance screen is being changed. For example, when the correction of the guidance is temporarily interrupted after the scan, the guidance screen may be marked as "correction in progress," In this case, it is possible to configure the change data so as to include an ID for recognition. The recognition ID may be XML data, a two-dimensional barcode, a pattern, a dot, or the like. Then, when the user tries to scan this guidance screen again, a warning, "This screen is being corrected", and selection options are displayed on the display unit. Then, when an image including the recognition ID is printed, it is automatically recognized as an image for guidance correction, and the specified page may be replaced.

With this kind of configuration, the correction operation may be easily continued even when the user leaves the place during the correction. Therefore, the time for being in front of the image forming apparatus 1 may be shortened, and the burden on other users may be suppressed.

Moreover, in the embodiment described above, an example in which the image forming apparatus 1 and the terminal 2 are connected via the network 5 is described.

However, the image forming apparatus 1 and the terminal 2 may be directly connected by a USB (Universal Serial Bus) or the like.

In this case, the image forming apparatus 1, in response to detecting that the terminal 2 is connected, is able to prepare a special port as described above, switch the scan source or the print destination, or cause the terminal 2 to install a device driver.

Moreover, in the embodiments described above, examples have been described in which the image forming apparatus 1 mainly acquires PDL print data as the change data 210.

However, various files including still image data, video data, document data, and the like other than PDL print data may be directly transmitted from the terminal 2 to the image forming apparatus 1. At this time, it may be possible to specify and transmit these files using the same procedure as printing.

Furthermore, the image forming apparatus 1 may perform various processes such as resolution conversion, color conversion, compression and the like so as to apply the change data 210 acquired from the terminal 2 to the screen data 200.

With this kind of configuration, it is possible to support a flexible configuration.

Moreover, in the embodiments described above, examples in which the terminal 2 changes a guidance screen of the image forming apparatus 1 are described.

However, by executing a program stored in the terminal 2, it may be possible to change a guidance screen of an image forming apparatus other than the image forming apparatus 1. In this case, another image forming apparatus connected by the network 5 may be used. For example, the guidance screen may be changed for an image forming apparatus of the same model, an image forming apparatus on the same floor, an image forming apparatus commonly used even if other models of image forming apparatuses, and the like. At this time, the model to be changed may be specified from the terminal 2.

In addition, the technique according to the present disclosure may also be applied to information processing apparatuses other than an image forming apparatus. In other words, a configuration is possible in which a server or the like to which a network scanner, or a scanner are separately connected by a USB or the like is used.

Moreover, the configuration and operation of the above embodiments are examples, and needless to say, the configuration and operation may be appropriately changed and executed without departing from the gist of the present disclosure.

What is claimed is:

1. An image forming apparatus comprising:
a storage unit configured to store screen data of a guidance screen;
an instruction acquiring unit configured to acquire an instruction to change the guidance screen stored in the storage unit;
a change acquiring unit configured to acquire, from an external terminal, change data corresponding to the instruction acquired by the instruction acquiring unit;
a change application unit configured to apply the change data acquired by the change acquiring unit to the screen data of the guidance screen; and
a display unit configured to display the screen data of the guidance screen to which the change data is applied by the change application unit;
wherein
the storage unit is a non-transitory recording medium;
the screen data comprises image data;
the change data comprises image data;
the external terminal is a computer;
the computer is connected to the image forming apparatus by a network or USB; and
said application of the change data to the screen data comprises replacing the screen data stored in the storage unit with the change data.

2. The image forming apparatus according to claim 1, wherein
the change acquiring unit
acquires print data outputted from the terminal as the change data, wherein the print data comprises is provided in a page description language ('PDL').

3. The image forming apparatus according to claim 1, further comprising
a guidance transmitting unit configured to transmit the screen data of the guidance screen to the terminal prior to said acquiring the change data from the terminal;
wherein
the change data is obtained by processing of the screen data by the terminal.

4. The image forming apparatus according to claim 3, wherein
the guidance transmitting unit
transmits the screen data of the guidance screen to the terminal according to a scan instruction from the terminal, wherein the scan instruction is an instruction that would, if not for the instruction to change the guidance screen, cause the image forming apparatus to read a document placed on platen glass.

5. The image forming apparatus according to claim 1, wherein
the instruction acquiring unit displays an edit button on-screen,
the instruction to change the guidance screen stored in the storage unit is acquired by a user pressing the edit button.

6. The image forming apparatus according to claim 1, wherein the guidance screen is a screen that is displayed in response to an error notification or a user instruction for guidance.

7. The image forming apparatus according to claim 6, wherein the error notification is selected from out of recording paper, out of toner, or paper jam.

8. An image forming method that is executed by an image forming apparatus comprising the steps of:
in the image forming apparatus,
storing screen data of a guidance screen in a non-transitory recording medium;
acquiring an instruction to change the stored guidance screen;
acquiring change data, from an external terminal corresponding to the acquired instruction;
applying the acquired change data to the screen data of the guidance screen; and
displaying the screen data of the guidance screen to which the change data is applied;
wherein
the screen data comprises image data;
the change data comprises image data;
the external terminal is a computer;
the computer is connected to the image forming apparatus by a network or USB; and
said application of the change data to the screen data comprises replacing the screen data stored in the non-transitory storage medium with the change data.

9. The image forming method according to claim 8, comprising
acquiring print data outputted from the terminal as the change data, wherein the print data comprises is provided in a page description language ('PDL').

10. The image forming method according to claim 8, further comprising a step of:
transmitting the screen data of the guidance screen to the terminal prior to said acquiring the change data from the terminal; wherein
the change data is obtained by processing the screen data by the terminal.

11. The image forming apparatus according to claim 10, wherein the step of
transmitting the screen data of the guidance screen to the terminal is according to a scan instruction from the terminal, wherein the scan instruction is an instruction that would, if not for the instruction to change the guidance screen, cause the image forming apparatus to read a document placed on platen glass.

12. The image forming method according to claim 8, wherein
the image forming apparatus displays an edit button,
the instruction to change the guidance screen is acquired by a user pressing the edit button.

13. The image forming method according to claim 8, wherein the guidance screen is a screen that is displayed in response to an error notification or a user instruction for guidance.

14. The image forming method according to claim 13, wherein the error notification is selected from out of recording paper, out of toner, or paper jam.

15. A non-transitory computer-readable recording medium that including instructions that is executed by an image forming apparatus, and the instructions including the steps of:
in the image forming apparatus,
storing screen data of a guidance screen non-transitorily in a recording medium;
acquiring an instruction to change the stored guidance screen;
acquiring change data, from an external terminal corresponding to the acquired instruction;
applying the acquired change data to the screen data of the guidance screen; and
displaying the screen data of the guidance screen to which the change data is applied;
wherein
the screen data comprises image data;
the change data comprises image data;
the external terminal is a computer;
the computer is connected to the image forming apparatus by a network or USB; and
said application of the change data to the screen data comprises replacing the screen data stored non-transitorily with the change data.

16. The recording medium according to claim 15, wherein the instructions include:
acquiring print data outputted from the terminal as the change data, wherein the print data comprises is provided in a page description language ('PDL').

17. The recording medium according to claim 15, wherein the instructions further include a step of:
transmitting the screen data of the guidance screen to the terminal prior to said acquiring the change data from the terminal; wherein
the change data is obtained by processing the screen data by the terminal.

18. The recording medium according to claim 17, wherein the step of:
transmitting the screen data of the guidance screen to the terminal is according to a scan instruction from the terminal, wherein the scan instruction is an instruction that would, if not for the instruction to change the guidance screen, cause the image forming apparatus to read a document placed on platen glass.

19. The recording medium according to claim 15, wherein the image forming apparatus displays an edit button,
the instruction to change the guidance screen is acquired by a user pressing the edit button.

20. The recording medium according to claim 15, wherein the guidance screen is a screen that is displayed in response to an error notification or a user instruction for guidance.

* * * * *